United States Patent
Haka

(10) Patent No.: US 7,140,267 B2
(45) Date of Patent: Nov. 28, 2006

(54) MULTI-SPEED DUAL CLUTCH TRANSMISSION

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 160 days.

(21) Appl. No.: 10/944,576

(22) Filed: Sep. 17, 2004

(65) Prior Publication Data
US 2005/0087030 A1    Apr. 28, 2005

Related U.S. Application Data

(60) Provisional application No. 60/513,478, filed on Oct. 22, 2003.

(51) Int. Cl.
*F16H 3/08*    (2006.01)
(52) U.S. Cl. .......................................... 74/331
(58) Field of Classification Search .................. 74/331, 74/330, 333
See application file for complete search history.

(56) References Cited

U.S. PATENT DOCUMENTS

| | | | | |
|---|---|---|---|---|
| 2,723,567 A | * | 11/1955 | Double et al. ................ 74/365 |
| 2,739,487 A | * | 3/1956 | Winther ........................ 74/330 |
| 3,769,857 A | * | 11/1973 | Whateley .................... 74/730.1 |
| 3,916,711 A | * | 11/1975 | Hoyer ............................ 74/360 |
| 4,580,459 A | * | 4/1986 | Zenker et al. ................. 74/359 |
| 4,777,837 A | * | 10/1988 | Lehle ............................ 74/360 |
| 5,385,064 A | | 1/1995 | Reece ........................... 74/331 |
| 6,244,123 B1 | | 6/2001 | Hegerath et al. ............. 74/325 |
| 6,669,596 B1 | | 12/2003 | Sefcik ........................ 475/278 |
| 7,021,169 B1 | * | 4/2006 | Kobayashi ................... 74/333 |

* cited by examiner

*Primary Examiner*—Dirk Wright
(74) *Attorney, Agent, or Firm*—Christopher DeVries

(57) ABSTRACT

A multi-speed, dual clutch transmission includes an input shaft, an output shaft, and first and second countershafts. The first and second countershafts are axially displaced from the input shaft, the output shaft and from one another. Four intermeshing gear pairs, an interconnecting gear set having first, second and third members, a first single gear and an idler gear, some of which are engageable with at least some of the shafts via a first clutch, a second clutch, and six torque-transmitting mechanisms, establish eight forward speed ratios and one reverse speed ratio. Furthermore, shifting between the forward speed ratios is dynamic.

18 Claims, 2 Drawing Sheets

| GEAR PAIR (by reference number as shown in Fig. 1) | Tq RATIO |
|---|---|
| 26 | 1.16 |
| 42 | 2.00 |
| 50:66 | -2.00 |
| 54 | 0.85 |
| 62 | 1.86 |
| 74(76:78) | 0.42 |
| 74(76:80) | 0.32 |

| | Tq Ratio | Step | $A_L$ | $A_R$ | B | C | D | E |
|---|---|---|---|---|---|---|---|---|
| REV (5 mesh) | -2.98 | | X | X | R | | | |
| 1st (4 mesh) | 2.77 | -1.08 | X | X | | | X | |
| 2nd (2 mesh) | 2.15 | 1.28 | X | | | | | |
| 3rd (2 mesh) | 1.70 | 1.27 | | X | | L | X | X |
| 4th (4 mesh) | 1.33 | 1.28 | | | | L | X | X |
| 5th (0 mesh) | 1.00 | 1.33 | | | L | L | | |
| 6th (4 mesh) | 0.81 | 1.24 | X | | | R | | X |
| 7th (2 mesh) | 0.64 | 1.27 | | | | R | R | |
| 8th (2 mesh) | 0.50 | 1.28 | | X | | R | X | |
| Overall Ratio 1st/8th | 5.564 | | | | | | | |

SYNCHRONIZER POSITION

X = ENGAGED SYNCHRONIZER
R = ENGAGED TO THE RIGHT
L = ENGAGED TO THE LEFT

MULTI-SPEED DUAL CLUTCH TRANSMISSION

CROSS-REFERENCE TO RELATED APPLICATIONS

This application claims the benefit of U.S. Provisional Application No. 60/513,478, filed Oct. 22, 2003, which is hereby incorporated by reference in its entirety.

TECHNICAL FIELD

The invention relates to a multi-speed, dual clutch transmission.

BACKGROUND OF THE INVENTION

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. This concept typically uses countershaft gears with a different, dedicated gear pair to achieve each forward speed ratio (with the exception of being able to achieve a direct drive ratio in a rear wheel drive application). Accordingly, the total number of gears required in this typical design is two times the number of forward speeds, plus three for reverse. This necessitates a large number of required gear pairs, especially in transmissions that have a relatively large number of forward speed ratios.

SUMMARY OF THE INVENTION

A dynamically-shiftable, dual clutch transmission includes an input shaft and an output shaft. A first countershaft and a second countershaft, both of which are axially displaced from the input shaft, from the output shaft and from one another, are also included. Thirteen external gears are also included in the transmission. The selective engagement is accomplished by two input clutches and six torque-transmitting mechanisms. The torque-transmitting mechanisms are selectively engageable for interconnecting at least some of the external gears with the input shaft, the output shaft, and the first and second countershafts, to transfer torque between the input shaft and the output shaft. By this selective engagement, the transmission establishes eight forward speed ratios and one reverse speed ratio. Furthermore, shifting between each of the forward speed ratios is dynamic. As used herein, "dynamic shifting" means that torque is present when a clutch shift to an oncoming speed ratio is made. (Dynamic shifting is accomplished herein via preselection of torque-transmitting mechanisms necessarily engaged in the oncoming speed ratio occurring just prior to the exchange of torque between the two input clutches.)

In another aspect of the invention, a first of the two input clutches is engaged for even-numbered forward speed ratios. A second of the two input clutches is engaged for odd-numbered forward speed ratios.

In another aspect of the invention, the thirteen external gears include four intermeshing co-planar gear pairs, a first single gear, an idler gear, and an interconnecting gear set having first, second and third members. A first of the six torque-transmitting mechanisms is selectively engageable for interconnecting a second member of a fourth of the four intermeshing co-planar gear pairs with the second countershaft.

In another aspect of the invention, a second of the six torque-transmitting mechanisms is selectively engageable for interconnecting the second member of the interconnecting gear set with the second countershaft.

In another aspect of the invention, a third of the six torque-transmitting mechanisms is selectively engageable in one direction for interconnecting the input shaft with the output shaft through a second of the two input clutches, and in another direction for selectively interconnecting the first single gear with the output shaft.

In another aspect of the invention, a fourth of the six torque-transmitting mechanisms is selectively engageable in one direction for interconnecting a first member of a fourth of the four gear pairs with the output shaft, and in another direction for interconnecting the first member of the interconnecting gear set with the output shaft.

In another aspect of the invention, a fifth of the six torque-transmitting mechanisms is selectively engageable for interconnecting a second member of a third of the four gear pairs with the third member of the interconnecting gear set.

In another aspect of the invention, a sixth of the six torque-transmitting mechanisms is selectively engageable for interconnecting the third member of the interconnecting gear set with the first countershaft.

In another aspect of the invention, at least one of the six torque-transmitting mechanisms is a double synchronizer.

In another aspect of the invention, the six torque-transmitting mechanisms include two double synchronizers and four single synchronizers.

In another aspect of the invention, the thirteen external gears include a plurality of intermeshing, co-planar gear pairs. A member of one of the co-planar gear pairs is continuously interconnected with the member of another of the co-planar gear pairs.

In another aspect of the invention, the thirteen external gears include an idler gear. The idler gear rotates about an axis disposed parallel to both the second countershaft and the output shaft. The idler gear intermeshes with two other of the thirteen external gears, a first of the two other gears being interconnectable with the second countershaft and a second of the two other gears being interconnectable with the output shaft.

In yet another aspect of the invention, selected ones of the six torque-transmitting mechanisms are engaged prior to shifting speed ranges to achieve shifting without torque interruptions.

In yet another aspect of the invention, a first and a second of the two input clutches are interchangeable to shift from even number speed ranges to odd number speed ranges, and vice versa.

A multi-speed, dual clutch transmission is provided that achieves eight forward speeds and one reverse speed using only thirteen external gears. The transmission includes an input shaft and an output shaft. A first countershaft and a second countershaft are both axially displaced from the input shaft, from the output shaft and from one another. A first intermeshing, co-planar gear pair having first and second members is selectively interconnectable with the input shaft via a first clutch. A second intermeshing, co-planar gear pair has first and second members and is selectively interconnectable with the input shaft via a second clutch.

A first single gear is selectively interconnectable with the input shaft. A third intermeshing; co-planar gear pair has first and second members. Additionally, a fourth intermeshing, co-planar gear pair has first and second members. The first member of the fourth gear pair is selectively interconnectable with the output shaft. The second member of the fourth gear pair is selectively interconnectable with the second countershaft. The first member of the third gear pair is continuously interconnected with the first member of the fourth gear pair. The transmission further includes an idler gear that is continuously meshing with the first single gear and with the second member of the fourth gear pair.

The multi-speed, dual clutch transmission includes an interconnecting gear set that has first, second and third members. The first member of the interconnecting gear set is selectively interconnectable with the output shaft. The second member of the interconnecting gear set is selectively interconnectable with the second countershaft. The third member of the interconnecting gear set is selectively interconnectable with the first countershaft. Additionally, the third member of the interconnecting gear set is selectively interconnectable with the second member of the third gear pair.

The multi-speed, dual clutch transmission further includes six torque-transmitting mechanisms. A first torque-transmitting mechanism is selectively engageable for interconnecting the second member of the fourth gear pair with the second countershaft. A second torque-transmitting mechanism is selectively engageable for interconnecting the second member of the interconnecting gear set with the second countershaft. A third torque-transmitting mechanism is selectively engageable for interconnecting either the input shaft with the output shaft through the second clutch or the first single gear with the output shaft.

A fourth torque-transmitting mechanism is selectively engageable for interconnecting the first member of the fourth gear pair with the output shaft. The fourth torque-transmitting mechanism is also selectively engageable for interconnecting the first member of the interconnecting gear set with the output shaft. A fifth torque-transmitting mechanism is selectively engageable for interconnecting the second member of the third gear pair with the third member of the interconnecting gear set. A sixth torque-transmitting mechanism is selectively engageable for interconnecting the third member of the gear set with the first countershaft. The first and second clutches and the torque-transmitting mechanisms described above are selectively engageable to provide at least eight forward speeds ratios and one reverse speed ratio between the input shaft and the output shaft, with the transmission being dynamically shiftable between the forward speeds ratios.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENT

Figures 1, 2A:
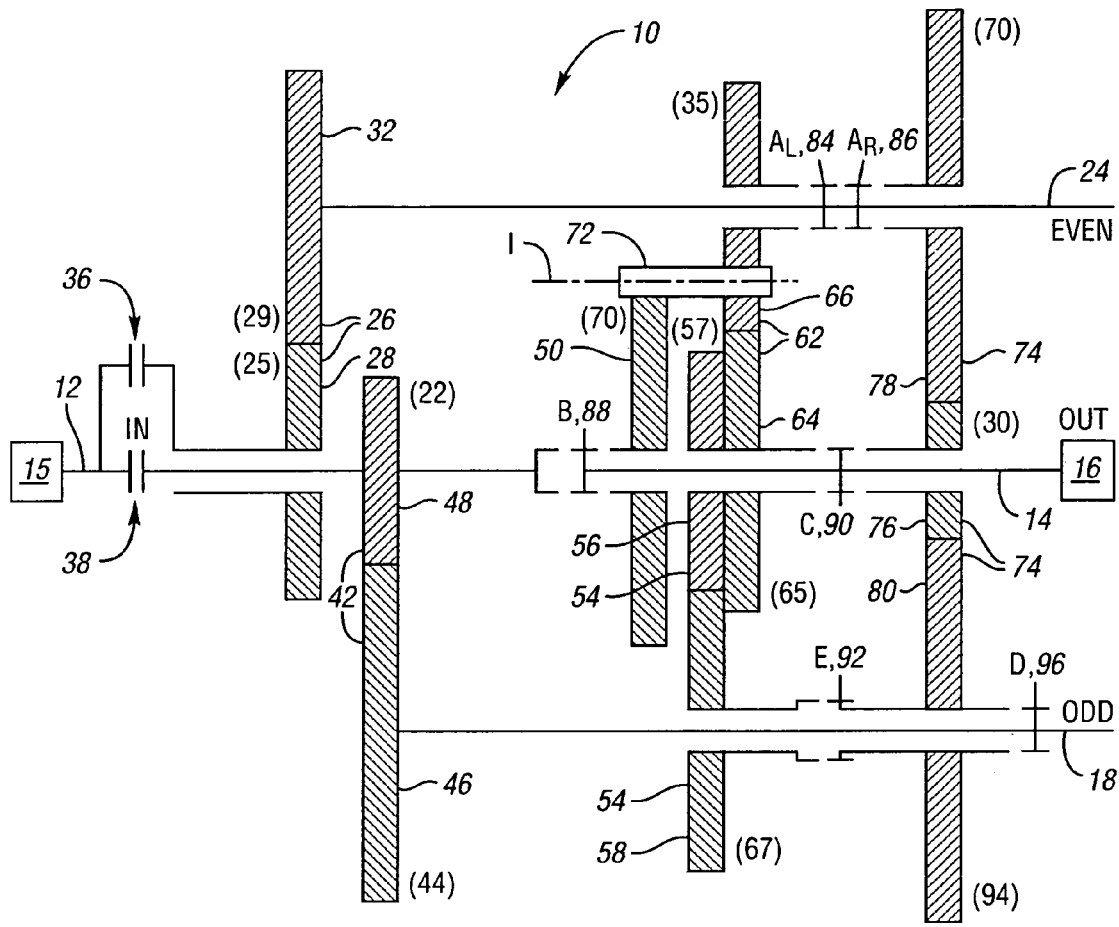
FIG. 1 is a schematic representation of a transmission in accordance with the invention.
FIG. 2A is a listing of the torque ratios by the transmission for the specific choice of external gear tooth counts in FIG. 1.

Referring to FIG. 1, a multi-speed, dual clutch transmission 10 is depicted. The transmission 10 includes an input shaft 12 and an output shaft 14. The input shaft 12 is continuously connected with a conventional engine 15. The output shaft 14 is continuously connected with a final drive unit 16. A first countershaft 18 and a second countershaft 24 are both axially displaced from the input shaft 12, from the output shaft 14 and from one another. The first countershaft 18 and the second countershaft 24 are generally parallel to the input shaft 12 and to the output shaft 14. A first intermeshing, co-planar gear pair 26 (i.e., a first headset) has a first member 28 and a second member 32. (The numbers shown in parentheses in FIG. 1 denote the number of teeth in each adjacent gear in the embodiment of the transmission 10 that results in the numerical torque ratios set forth in FIG. 2B. The gears depicted may have a variety of different numbers of teeth within the scope of the invention. As will be readily understood by those skilled in the art, different numerical torque ratios are achieved by varying the number of teeth in one or more of the gears.) The first member 28 of the first gear pair 26 is selectively interconnectable (also referred to herein as selectively engageable) with the input shaft 12 through the first clutch 36. The second member 32 is fixed to the second countershaft 24.

A second intermeshing, co-planar gear pair 42 (i.e., a second headset) includes a first member 48 selectively interconnectable with the input shaft 12 through the second clutch 38 and a second member 46 fixed to the first countershaft 18. A first single gear 50 is rotatable about and selectively interconnectable with the output shaft 14.

The transmission 10 includes a third intermeshing, co-planar gear pair 54. The third gear pair 54 has a first member 56 rotatable about and selectively interconnectable with the output shaft 14. The third gear pair 54 further includes a second member 58 that is rotatable about the first countershaft 18.

The transmission 10 includes a fourth intermeshing, co-planar gear pair 62. The fourth gear pair 62 has a first member 64 rotatable about and selectively interconnectable with the output shaft 14. The fourth gear pair 62 further includes a second member 66 that is rotatable about and selectively interconnectable with the second countershaft 24. The first member 56 of the third gear pair 54 is continuously interconnected with the first member 64 of the fourth gear pair 62.

The transmission 10 further includes an idler gear 72. The idler gear 72 is rotatable about an axis I that is parallel to the axes of the input shaft 12, the output shaft 14, the first countershaft 18, and the second countershaft 24. The idler gear 72 continuously intermeshes with both the first single gear 50 and the second member 66 of the fourth gear pair 62.

The transmission 10 further includes an interconnecting gear set 74. The interconnecting gear set 74 includes a first member 76 that is rotatable about and selectively interconnectable with the output shaft 14. The interconnecting gear set 74 further includes a second member 78 that is rotatable about and selectively interconnectable with the second countershaft 24. The first member 76 and the second member 78 intermesh with one another. The interconnecting gear set 74 further includes a third member 80 that is rotatable about and selectively interconnectable with the first countershaft 18. The first member 76 of the interconnecting gear set 74 and the third member 80 of the interconnecting gear set 74 intermesh with one another. Furthermore, the third member 80 of the interconnecting gear set 74 is selectively interconnectable with the second member 58 of the third gear pair 54.

The transmission 10 includes a first torque-transmitting mechanism 84, also denoted in FIG. 1 and referred to herein by $A_L$. $A_L$ is a typical, single dog clutch and synchronizer for synchronizing speeds upon engagement, as used in automotive manual transmissions and will be known to those skilled in the art. $A_L$ is moveable for engaging the second member 66 of the fourth gear pair 62 with the second countershaft 24. Specifically, $A_L$ remains in a neutral position to disconnect the second member 66 of the fourth gear pair 62 from the second countershaft 24 and is moveable towards the second member 66 of the fourth gear pair 62 (i.e., to the left in FIG. 1) to interconnect the second member 66 of the fourth gear pair 62 with the second countershaft 24.

The transmission 10 includes a second torque-transmitting mechanism 86, also depicted in FIG. 1 and referred to herein as $A_R$. $A_R$ is also a typical, single dog clutch/synchronizer. $A_R$ is moveable from a neutral, disengaged position towards the second member 78 of the interconnecting gear set 74 (i.e., to the right in FIG. 1) to an engaged position in which the second member 78 of the interconnecting gear set 74 is thereby interconnected with the second countershaft 24.

The transmission 10 further includes a third torque-transmitting mechanism 88, also depicted in FIG. 1 and referred to herein as B. B is a double dog clutch/synchronizer, similar to what is typical in automotive manual transmissions. B is selectively moveable from a disengaged position towards the first member 48 of the second gear pair 42 (i.e., to the left in FIG. 1), thereby interconnecting the input shaft 12 with the output shaft 14 through the second clutch 38. Alternatively, B is selectively moveable from the disengaged position towards the first single gear 50 (i.e., to the right in FIG. 1) for interconnecting the first single gear 50 with the output shaft 14.

The transmission 10 further includes a fourth torque-transmitting mechanism 90, depicted in FIG. 1 and also referred to herein as C. Like B, C is a double dog clutch/synchronizer. C is selectively moveable from a disengaged position towards the first member 64 of the fourth gear pair 62 (i.e., to the left in FIG. 1) for interconnecting the first member 64 of the fourth gear pair 62 with the output shaft 14. Alternatively, C is selectively moveable from the disengaged position towards the first member 76 of the interconnecting gear set 74 (i.e., to the right in FIG. 1) for selectively interconnecting the first member 76 of the interconnecting gear set 74 with the output shaft 14.

The transmission 10 further includes a fifth torque-transmitting mechanism 92, depicted in FIG. 1 and also referred to herein as E. E is a single dog clutch/synchronizer selectively moveable from a disengaged position toward the second member 58 of the third gear pair 54 (i.e., to the left in FIG. 1) whereby the second member 58 of the third gear pair 54 is thereby interconnected with the third member 80 of the interconnecting gear set 74.

The transmission 10 further includes a sixth torque-transmitting mechanism 96, also depicted in FIG. 1 and referred to herein as D. D is a single dog clutch/synchronizer moveable from a disengaged position towards the third member 80 of the interconnecting gear set 74 (i.e., to the left in FIG. 1) whereby the third member 80 of the interconnecting gear set 74 is interconnected with the first countershaft 18. Accordingly, the transmission 10 includes an input shaft, an output shaft, a first countershaft, a second countershaft, a first clutch, a second clutch, thirteen gears, two double synchronizers and four single synchronizers. As is known to those skilled in the art, six forks (one for each dog clutch/synchronizer) and eight blocker rings (one for each single dog clutch/synchronizer and two for each double dog clutch/synchronizer) are used to control movement and engagement of the four single dog clutch/synchronizers and the two double dog clutch/synchronizers.

The transmission 10 is capable of transmitting torque from the input shaft 12 to the output shaft 14 at at least eight forward speed ratios and one reverse speed ratio. Furthermore, the transmission of torque from the input shaft 12 to the output shaft 14 at forward speeds is accomplished by dynamic shifting between clutches 36 and 38. As will be readily understood by those skilled in the art, prior to making a "dynamic shift", the torque-transmitting mechanisms are preselected to the necessary positions of both the oncoming and off-going speeds prior to actually shifting the torque path from clutch 36 or 38 (or vice versa). The pre-select condition is postponed as much as possible because preselecting the next ratio forces a speed difference in the open clutch 36 or 38 and it is desirable to minimize spin losses. This particular gear arrangement allows the combination of torque-transmitting mechanisms for any ratio and its neighboring ratio (i.e., ratio N and ratio N+1) without obtaining a mechanical tie-up in the transmission.

The discussion will now turn to the manner in which each of the eight forward speeds and the reverse speed are achieved by the transmission 10. To establish the reverse speed, the torque-transmitting mechanisms are selected as set forth table 100 of FIG. 2B. $A_L$ is set to its engaged position to the left in FIG. 1. $A_R$ is also set to an engaged position (to the right). B is moved to the right. D is moved to the left. C and E remain in disengaged, neutral positions. The second input clutch 38 is engaged which interconnects the first member 48 of the second gear pair 42 with the input shaft 12. Accordingly, torque is transferred from the input shaft through the second gear pair 42, to the third member 80 of the interconnecting gear set 74. Torque is carried to the second member 78 of the interconnecting gear set 74 through the first member 76 of the interconnecting gear set 74, which is not interconnected with the output shaft 14 because C is in a disengaged position. Torque is then transferred from the second member 78 of the interconnecting gear set 74 to the second countershaft shaft 24, then from the second countershaft 24 to the second member 66 of the fourth gear pair 62 across the idler gear 72 to the first single gear 50 which is interconnected with the output shaft 14 because B is moved to the right, engaged position. Accordingly, the torque is transferred to the output shaft 14. In reverse speed, there are five active gear meshes (a first mesh between the members of the second gear pair 42, second and third meshes between the three members of the interconnecting gear set 74, a fourth mesh between the second member 66 of the fourth gear pair 62 and the idler gear 72, and a fifth mesh between the idler gear 72 and the first single gear 50).

To achieve the first speed, $A_L$ is moved to in the engaged, left position. $A_R$ is moved to the engaged, right position. C is moved to the engaged, left position. D is also moved to the engaged position. B and E are in disengaged positions. The second clutch 38 engages such that the first member 48 of the second gear pair 42 is selectively interconnected with the input shaft 12. Accordingly, torque is transferred from the input shaft 12 through clutch 38 to the second gear pair 42, through the third member 80 of the interconnecting gear set 74 to the second member 78 of the interconnecting gear set 74 (the second and third members 78, 80, respectively, of the interconnecting gear set 74 are connected via the disengaged first member 76 of the interconnecting gear set 74). Torque is then transferred to the second countershaft 24, then from the second countershaft 24 to the fourth gear pair 62, and to the output shaft 14 via the first member 64 of the fourth gear pair 62 that is interconnected with the output shaft 14 because C is in the left position. Accordingly, in the first speed, there are four active meshes (a first mesh at the second gear pair 42, second and third meshes at the interconnecting gear set 74 and a fourth mesh at the fourth gear pair 62). The first speed is unique in that the second speed is already preselected (i.e., the first clutch 36 is forced to have a slip speed). This makes it possible to place some of the launch energy into clutch 36 by using both the first clutch 36 and the second clutch 38 to launch the vehicle. It will be necessary to remove clutch 36 prior to locking up clutch 38 so as to avoid a tie-up.

Figure 2B:
FIG. 2B is a truth table listing the torque ratios achieved by and synchronizer positions for each of the speeds of the transmission of FIG. 1.

To achieve the second speed, the torque transmitting mechanisms are engaged as shown in table 100 of FIG. 2B. In second speed, $A_L$ remains engaged to the left. $A_R$ can be placed in a disengaged position, B remains in a disengaged position, C remains to the left to interconnect the first member 64 of the fourth gear pair 62 with the output shaft 14, D can be placed in a disengaged position and E remains in a disengaged position. Because the second speed only requires two torque-transmitting mechanisms, both of which are applied in the first speed, it is possible to dynamically shift from the first speed to the second speed by simply applying clutch 36 and releasing clutch 38. After the one-two shift is completed, it will be desirable to remove shift mechanisms $A_R$ and D to minimize spin losses. To move from second speed back to first speed, $A_R$ is moved back to the engaged position and D is moved back to the engaged position. $A_R$ and D are moved prior to actual engagement of the second clutch 38, so that the shift from the second speed to the first speed can be dynamic. In the second speed, torque is transferred from the first gear pair 26, to the fourth gear pair 62 and then to the output shaft 14. Two active meshes occur in second speed (a first mesh at the first gear pair 26 and a second mesh at the fourth gear pair 62).

To achieve the third speed, C remains engaged to the left, D is moved to an engaged position (i.e., to the left), and E is moved to an engaged position, also to the left and the second clutch 38 is engaged. Accordingly, after switching from second speed to third speed, $A_L$ is moved to a disengaged position to minimize spin losses in the first clutch 36. In third speed, torque is transferred from the input shaft 12 through the engaged second clutch 38, to the second gear pair 42 through the engaged third gear pair 54 to the output shaft 14. Accordingly, two active meshes occur in third speed (one mesh at the second gear pair 42 and one mesh at the third gear pair 54).

To achieve the fourth speed, $A_R$ is moved to an engaged position, to the right, C remains in the engaged left position, and E remains in an engaged position; then the first clutch 36 can be applied to connect the input shaft 12 to the first gear pair 26. After the shift is completed, D can be moved from the engaged position it maintained in the third speed to a disengaged position to minimize spin losses. Accordingly, the dog clutch/synchronizer movements required in shifting from third speed to fourth speed is the engagement of $A_R$. This movement must be made prior to actual engagement of the first clutch 36 so that the shift will be dynamic.

In the fourth speed, torque is transferred from the first gear pair 26 to the second member 78 of the interconnecting gear set 74. Torque then moves through the first member 76 of the interconnecting gear set 74 and the third member 80 of the interconnecting gear set 74 to the engaged third gear pair 54 and to the output shaft 14. Accordingly, four active meshes occur in the fourth speed (one mesh in the first gear pair 26, two meshes in the interconnecting gear set 74 and one mesh in the third gear pair 54).

To achieve the fifth speed, B is moved to the engaged left position, and second clutch 38 is applied. Shift mechanisms $A_R$, C and E are moved from engaged positions to disengaged positions after the shift is completed to minimize spin losses.

Accordingly, in fifth speed, the input shaft 12 is directly interconnected with the output shaft 14 via B and the engaged second clutch 38. There are no active gear meshes in fifth speed (i.e., torque is transmitted directly from the input shaft 12 to the output shaft 14).

To achieve the sixth speed, $A_L$ and E are moved to an engaged position, C is moved to the engaged, right position and the first clutch 36 is applied. $A_L$, C and E are moved prior to engagement of the first clutch 36, so that the shift is dynamic. After shifting from fifth speed to sixth speed, B is moved from an engaged position to a disengaged position to minimize spin losses.

Accordingly, in sixth speed, torque is transferred from the input shaft 12 through the first gear pair 26 via the engaged first clutch 36, through the second gear pair 62, through the continuously interconnected first member 56 of the third gear pair 54, through the second member 58 of the third gear pair 54, through the third member 80 of the interconnecting gear set 74 to the engaged first member 76 of the interconnecting gear set 74 to the output shaft 14. Accordingly, in the sixth speed there are four active meshes (a first mesh at the first gear pair 26, a second mesh at the fourth gear pair 62, a third mesh at the third gear pair 54 and a fourth mesh between the first and second members 76, 78 of the interconnecting gear set 74, respectively).

To achieve the seventh speed, D is engaged and the second clutch 38 is applied. D is engaged prior to engagement of the second clutch 38 so that the shift is dynamic. Referring to the table of FIG. 2B, in seventh speed, $A_L$, $A_R$, B and E are in disengaged positions. C remains engaged to the right. Accordingly, after shifting from sixth speed to seventh speed, $A_L$ and E are moved from an engaged position to a disengaged position to minimize spin losses.

Accordingly, in seventh speed, torque is transmitted from the input shaft 12 via the engaged second clutch 38 through the engaged first member 48 of the second gear pair 42 through the second member 46 of the second gear pair 42 to the engaged third member 80 of the interconnecting gear set 74 and the engaged first member 76 of the interconnecting gear set 74 to the output shaft 14. Accordingly, in the seventh speed there are two active meshes (a first mesh in the second gear pair 42 and a second mesh between the first member 76 of the interconnecting gear set 74 and the second member 80 of the interconnecting gear set 74).

To achieve the eighth speed, $A_R$ is in an engaged position to the right and clutch 36 is engaged. $A_R$ is moved prior to engagement of the first clutch 36 so that the shift is dynamic. After shifting from the seventh speed to the eighth speed, D is moved from an engaged position to a disengaged position.

Accordingly, in the eighth speed, torque is transferred from the input shaft 12 via the first clutch 36 through the engaged first member 28 of the first gear pair 26, through the second member 32 of the first gear pair 26 to the engaged second member 78 of the interconnecting gear set 74 and the engaged first member 76 of the interconnecting gear set 74 to the output shaft 14. Accordingly, there are two active meshes in the eighth speed (a first mesh in the first gear pair 26 and a second mesh between the first member 76 and second member 78 of the interconnecting gear set 74).

Notably, gears are reused in the various speed ratios achieved by the transmission 10 (unlike a typical dual clutch design which uses a separate, dedicated gear pair for each speed). For instance, the second member 66 of the fourth gear pair 62 is used in reverse, first, second and sixth speed. The second member 58 of the third pair 54 is used in third, fourth and sixth speeds. The use of other gears is also repeated, as discussed above with respect to the torque path of each speed ratio.

Referring to table 98 of FIG. 2A, the torque ratio at each headset (26 and 28) and other external gear within the transmission 10 of FIG. 1 is set forth, as will be understood by those skilled in the art. (The specific torque ratio values achieved correspond to the number of teeth selected for each gear in the transmission 10 of FIG. 1 (number of teeth shown in parentheses adjacent each gear in FIG. 1).)

Referring to the table 100 of FIG. 2B, the torque ratios for each speed as well as the step between each speed (i.e., the ratio of torque ratio at speed N to torque ratio at speed N+1) are shown. It is evident from table 100, that for underdrive speed ratios, the position of C is engaged to the left. For overdrive speed ratios, the position of C is engaged to the right. Because a dynamic shift may not be accomplished if C must move from the left position to the right position in subsequent speeds, the transmission 10 of FIG. 1 must be placed in the direct drive ratio (i.e., fifth speed) at which C is in a disengaged, neutral position in order to dynamically shift from underdrive to overdrive (i.e., it is not possible to dynamically skip shift from underdrive to overdrive ratio).

Because the transmission 10 of FIG. 1 reuses gears in achieving eight forward speed ratios, a repetitive step occurs (i.e., see 1.28 step at fourth and eighth speed). It is preferable to choose tooth count of the gears such that other (nonrepeating) steps are geometric, i.e., of a similar magnitude.

While the best mode for carrying out the invention has been described in detail, those familiar with the art to which this invention relates will recognize various alternative designs and embodiments for practicing the invention within the scope of the appended claims.

The invention claimed is:

1. A dynamically-shiftable dual clutch transmission comprising:
   an input shaft;
   an output shaft;
   a first countershaft;
   a second countershaft, wherein said first and second countershafts are axially displaced from said input shaft, from said output shaft and from one another;
   only thirteen external gears;
   two input clutches and six torque-transmitting mechanisms, wherein said input clutches and torque-transmitting mechanisms are selectively engageable for interconnecting at least some of said external gears with said input shaft, said output shaft, said first countershaft, said second countershaft or with one another to transfer torque between said input shaft and said output shaft;
   wherein by said selective engagement said transmission establishes eight forward speed ratios and one reverse speed ratio; and
   wherein shifting between each of said forward speed ratios is dynamic.

2. The dual clutch transmission of claim 1, wherein a first of said two input clutches is engaged for even-numbered forward speed ratios; and wherein a second of said two input clutches is engaged for odd-numbered forward speed ratios.

3. The dual clutch transmission of claim 1, wherein said thirteen external gears include four intermeshing co-planar gear pairs, a first single gear, an idler gear, and an interconnecting gear set having first, second and third members; and
   wherein a first of said six torque-transmitting mechanisms is selectively engageable for interconnecting a second member of a fourth of said four intermeshing co-planar gear pairs with said second countershaft.

4. The dual clutch transmission of claim 1, wherein said thirteen external gears include four intermeshing co-planar gear pairs, a first single gear, an idler gear, and an interconnecting gear set having first, second and third members; and
   wherein a second of said six torque-transmitting mechanisms is selectively engageable for interconnecting said second member of said interconnecting gear set with said second countershaft.

5. The dual clutch transmission of claim 1, wherein said thirteen external gears include four intermeshing co-planar gear pairs, a first single gear, an idler gear, and an interconnecting gear set having first, second and third members; and
   wherein a third of said six torque-transmitting mechanisms is selectively engageable in one direction for interconnecting said input shaft with said output shaft through a second of said two input clutches, and in another direction for selectively interconnecting said first single gear with said output shaft.

6. The dual clutch transmission of claim 1, wherein said thirteen external gears include four intermeshing co-planar gear pairs, a first single gear, an idler gear, and an interconnecting gear set having first, second and third members; and
   wherein a fourth of said six torque-transmitting mechanisms is selectively engageable in one direction for interconnecting a first member of a fourth of said four gear pairs with said output shaft, and in another direction for interconnecting said first member of said interconnecting gear set with said output shaft.

7. The dual clutch transmission of claim 1, wherein said thirteen external gears include four intermeshing co-planar gear pairs, a first single gear, an idler gear, and an interconnecting gear set having first, second and third members; and
   wherein a fifth of said six torque-transmitting mechanisms is selectively engageable for interconnecting a second member of a third of said four gear pairs with said third member of said interconnecting gear set.

8. The dual clutch transmission of claim 1, wherein said thirteen external gears include four intermeshing co-planar gear pairs, a first single gear, an idler gear, and an interconnecting gear set having first, second and third members; and
   wherein a sixth of said six torque-transmitting mechanisms is selectively engageable for interconnecting said third member of said interconnecting gear set with said first countershaft.

9. The dual clutch transmission of claim 1, wherein at least one of said six torque-transmitting mechanisms is a double synchronizer.

10. The dual clutch transmission of claim 1, wherein said six torque-transmitting mechanisms include two double synchronizers and four single synchronizers.

11. The dual clutch transmission of claim 1, wherein said thirteen external gears include a plurality of intermeshing, co-planar gear pairs; and
   wherein a member of one of said co-planar gear pairs is continuously interconnected with a member of another of said co-planar gear pairs.

12. The dual clutch transmission of claim 1, wherein said thirteen external gears includes an idler gear; wherein said idler gear rotates about an axis disposed parallel to both said second countershaft and said output shaft; and wherein said idler gear intermeshes with two other of said thirteen external gears, a first of said two other gears being interconnectable with said second countershaft and a second of said two other gears being interconnectable with said output shaft.

13. The dual clutch transmission of claim 1, wherein selected ones of said six torque-transmitting mechanisms are engaged prior to shifting speed ranges to achieve shifting without torque interruptions.

14. The dual clutch transmission of claim 1, wherein a first and a second of said two input clutches are interchangeable to shift from even numbered speed ranges to odd numbered speed ranges, and vice versa.

15. A multi-speed, dual clutch transmission comprising:
an input shaft;
an output shaft;
a first countershaft and a second countershaft both axially displaced from said input shaft, from said output shaft and from one another;
a first and a second clutch;
a first intermeshing, co-planar gear pair having first and second members and being selectively interconnectable with said input shaft via said first clutch;
a second intermeshing, co-planar gear pair having first and second members, said second gear pair being selectively interconnectable with said input shaft via said second clutch;
a first single gear selectively interconnectable with said output shaft;
a third intermeshing, co-planar gear pair having first and second members;
a fourth intermeshing, co-planar gear pair having first and second members, said first member of said fourth gear pair being selectively interconnectable with said output shaft, said second member of said fourth gear pair being selectively interconnectable with said second countershaft;
wherein said first member of said third gear pair is continuously interconnected with said first member of said fourth gear pair;
an idler gear continuously meshing with said first single gear and with said second member of said fourth gear pair;
an interconnecting gear set having first, second and third members, said first member of said gear set being selectively interconnectable with said output shaft, said second member of said gear set being selectively interconnectable with said second countershaft, and said third member of said gear set being selectively interconnectable with said first countershaft or with said second member of said third gear pair;
a first torque-transmitting mechanism selectively engageable for interconnecting said second member of said fourth pair with said second countershaft;
a second torque-transmitting mechanism selectively engageable for interconnecting said second member of said interconnecting gear set with said second countershaft;
a third torque-transmitting mechanism selectively engageable for interconnecting said input shaft with said output shaft through said second clutch or for selectively interconnecting said first single gear with said output shaft;
a fourth torque-transmitting mechanism selectively engageable for interconnecting said first member of said fourth gear pair with said output shaft or for selectively interconnecting said first member of said interconnecting gear set with said output shaft;
a fifth torque-transmitting mechanism selectively engageable for interconnecting said second member of said third gear pair with said third member of said interconnecting gear set;
a sixth torque-transmitting mechanism selectively engageable for interconnecting said third member of said interconnecting gear set with said first countershaft;
wherein said first and second clutches and said first, second, third, fourth, fifth and sixth torque-transmitting mechanisms are selectively engageable to provide at least eight forward speed ratios and one reverse speed ratio between said input shaft and said output shaft and wherein said transmission is dynamically shiftable between forward speed ratios.

16. The multi-speed, dual clutch transmission of claim 15, wherein said first input clutch is engaged for even-numbered forward speed ratios; and
wherein said second input clutch is engaged for odd-numbered forward speed ratios.

17. The multi-speed, dual clutch transmission of claim 15, wherein selected ones of said first, second, third, fourth, fifth and sixth torque-transmitting mechanisms are engaged prior to shifting speed ranges to achieve shifting without torque interruption.

18. The multi-speed, dual clutch transmission of claim 15, wherein said first input clutch and said second input clutch are interchangeable to shift from even number speed ranges to odd number speed ranges, and vice versa.

* * * * *